Patented Jan. 3, 1950

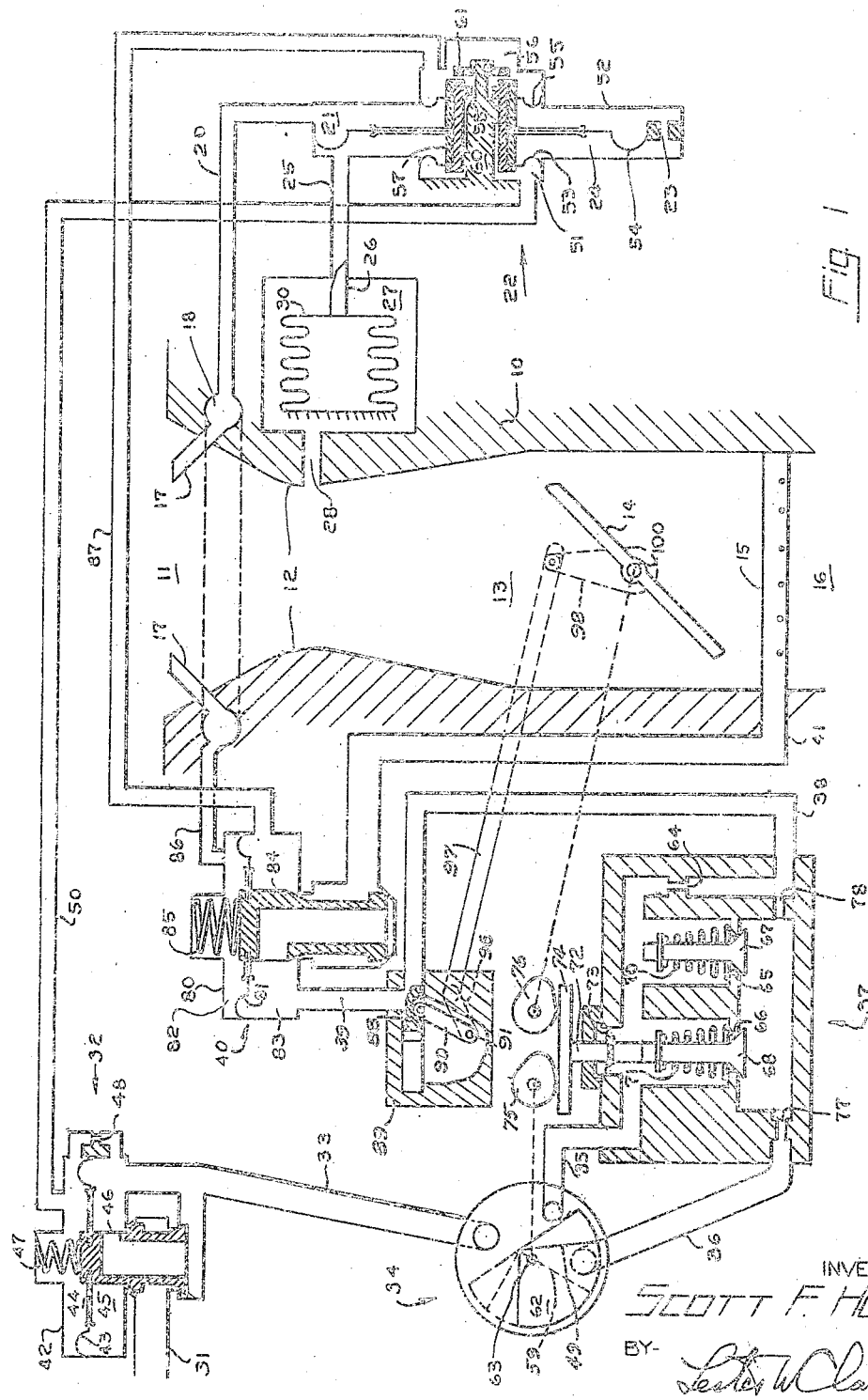

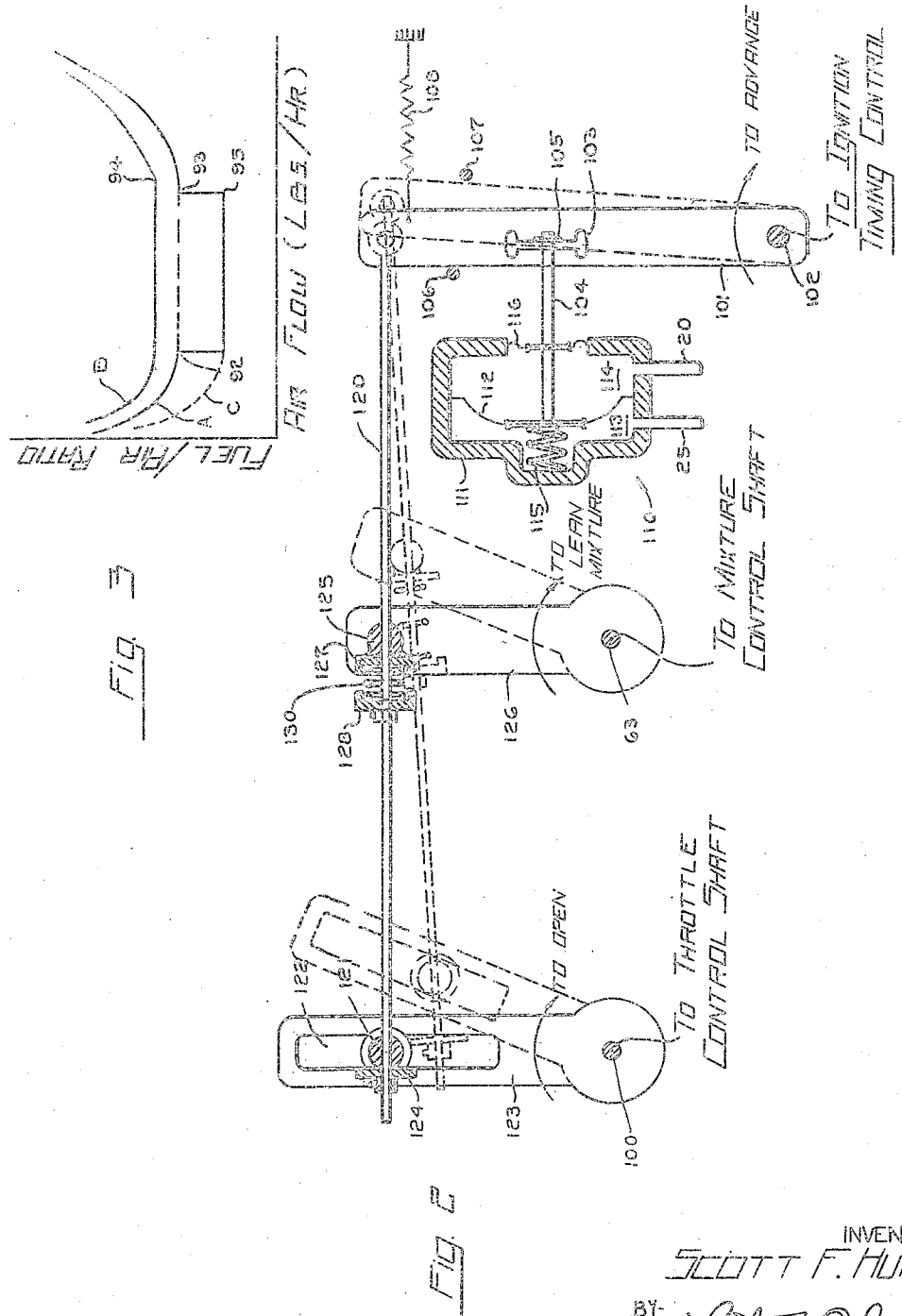

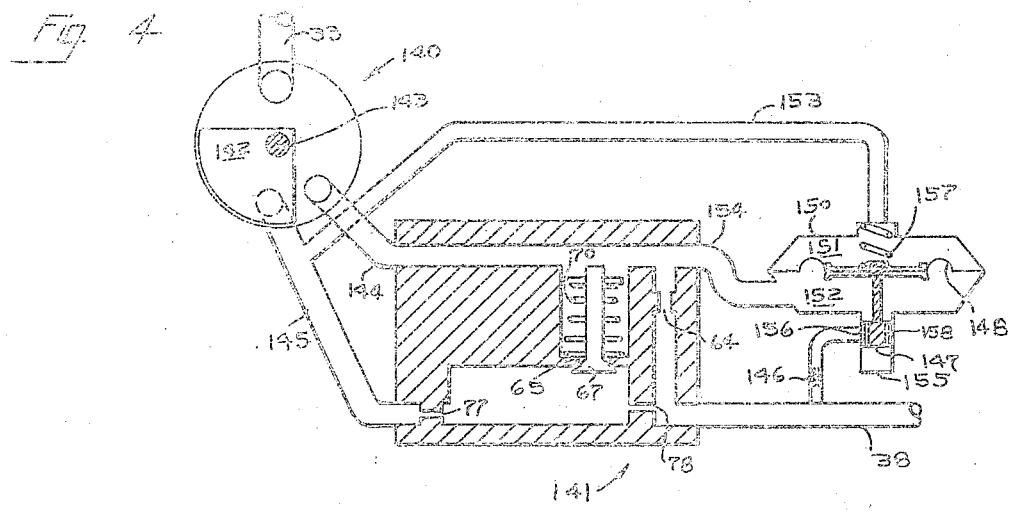
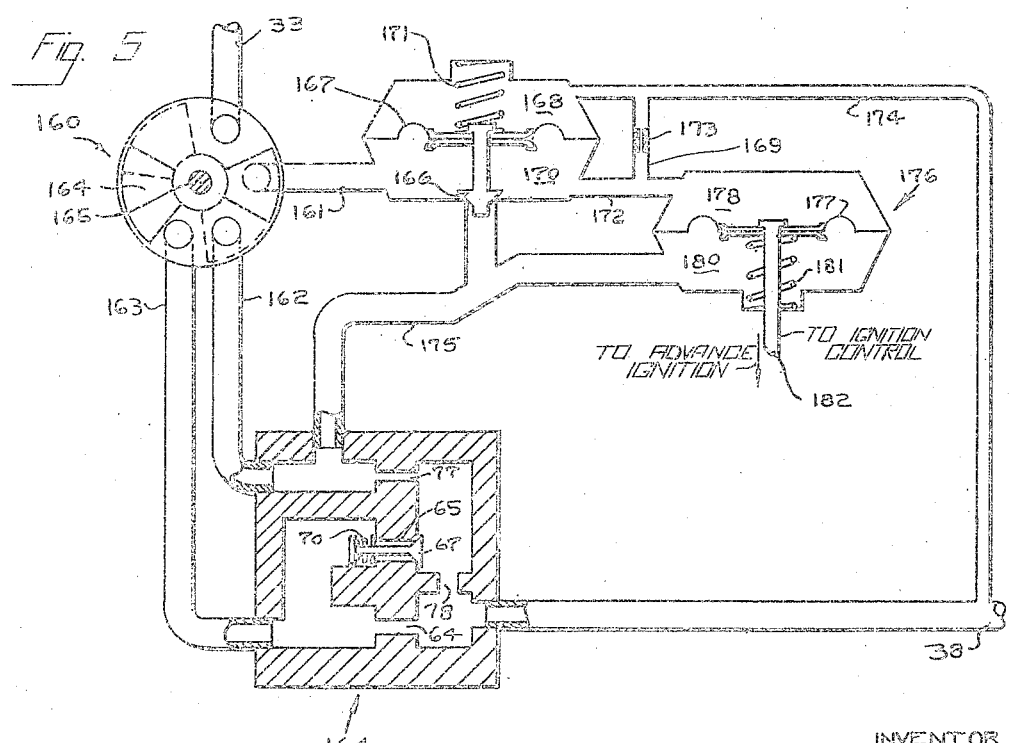

2,493,582

UNITED STATES PATENT OFFICE 2,493,582

CONTROL APPARATUS FOR INTERNAL-COMBUSTION ENGINES

Scott F. Hunt, Meriden, Conn., assignor, by mesne assignments, to Niles-Bement-Pond Company, West Hartford, Conn., a corporation of New Jersey Application October 20, 1943, Serial No. 506,945

30 Claims. (Cl. 123—117)

The present invention relates to control apparatus for internal combustion engines, and especially to apparatus for controlling the ignition timing and the ratio of fuel to air supplied for purposes of combustion.

It has been found that internal combustion engines of the type used on aircraft may be operated at certain intermediate loads with a very lean ratio of fuel to air, which at other loads would cause faulty operation or might even result in damage to the engine. Furthermore, it has been found that the performance of the engine is improved when such a lean fuel to air ratio is used if the ignition timing is considerably advanced from its normal relationship.

The use of such an extremely lean fuel to air ratio is usually not desirable under normal conditions of engine operation, since the engine tends to run too hot, and may be damaged if the very lean mixture is used for a long period of time. Under emergency conditions, however, as when an aircraft is too far from its base to return if the fuel remaining is consumed at the normal rate, it becomes very desirable to take advantage of the economy made possible by operating on a very lean fuel to air ratio, even though the engine may be damaged as a result.

An object of the present invention is therefore to provide improved apparatus for controlling the fuel to air ratio in internal combustion engines so as to secure maximum economy.

Another object is to provide improved means whereby the pilot of an aircraft may determine whether the engine is to be operated in a conventional manner or is to operate with a fuel to air ratio and ignition timing chosen for maximum economy.

Another object of the present invention is to provide a fuel supply system for an internal combustion engine including means for controlling the fuel to air ratio so that a very lean ratio is provided at an intermediate range of engine loads and a richer ratio is provided when the load is outside that range.

Another object is to provide, in connection with such a system, means for advancing the ignition timing when the very lean fuel to air ratio is used.

Another object of my invention is to provide improved ignition timing and mixture control means of the type described and claimed in the copending application of Milton E. Chandler, Serial No. 491,442, filed June 19 1943, now Patent No. 3,432,283, issued December 9, 1947.

A further object of the present invention is to provide a valve responsive to the load of the internal combustion engine for increasing the fuel to air ratio when the load exceeds a predetermined value, and mechanical means for positively opening the valve in response to other conditions indicative of the need for a richer fuel to air ratio.

A further object is to provide, in a fuel supply system for an internal combustion engine, improved means for enriching the fuel to air ratio at low and high engine loads including a single valve responsive to the engine load, and operated so as to close when the load is in an intermediate range and open when the load is below or above that range.

A further object is to provide, in an ignition timing and mixture control system for an internal combustion engine, motor means utilizing the fuel pressure as a source of power for operating the ignition timing control.

Other objects and advantages of my invention will become apparent from a consideration of the appended specification, claims and drawing, in which Figure 1 is a somewhat diagrammatic illustration of a carburetor for an internal combustion engine, embodying an improved mixture control system built in accordance with the principles of my invention, Figure 2 illustrates an ignition control system built in accordance with the principles of my invention, which may be used in conjunction with the carburetor of Figure 1.

Figure 3 is a graphical illustration of the relationship between the fuel to air ratio and the air flow in the carburetor of Figure 1, Figure 4 illustrates a modified form of mixture control, which may be used in place of the mixture control arrangement of Figure 1, and Figure 5 illustrates a modified form of mixture and ignition control, which may be used to replace the mixture control of Figure 1 and the ignition control of Figure 2.

Figure 1

Referring to the drawing, there is shown in Figure 1 a portion 10 of a carburetor body. Air enters the carburetor at an inlet 11, and flows past a Venturi restriction 12, thru a passage 13, past a throttle 14 and a discharge nozzle 15 to an outlet 16.

The quantity of air flowing thru the passage 13 may be determined from the difference between the air pressures at the inlet 11 and at the throat of the venturi 12. This difference of pressures causes a flow of air thru a second passage connecting the inlet 11 and the throat of venturi 12. This second passage may be traced from the inlet 11 thru a plurality of impact tubes 17, a passage 18 interconnecting the impact tubes, a conduit 20, an expansible chamber 21 in a pressure meter generally indicated at 22, a restriction 23, another expansible chamber 24 in the pressure meter 22, a conduit 25, past a valve 26 into a chamber 27, and thru a conduit 28 to the throat of venturi 12.

In the second passage just traced, there are two restrictions, the fixed restriction 23 and the valve 26. Valve 26 is operated by a bellows 30 mounted in the chamber 27. The bellows 30 is sealed, and is preferably filled with a temperature responsive fluid, for example, nitrogen. Since the bellows 30 is mounted in chamber 27, it expands and contracts in accordance with the variation of the pressure and temperature in that chamber. The pressure in chamber 27 varies with the atmospheric pressure and also with the variations in the velocity of the air flowing thru the Venturi restriction 12.

The difference in pressure between the inlet 11 and the throat of venturi 12 varies in accordance with the velocity of the air passing thru it, rather than in accordance with the mass of the air. Since, for a given mass of air flowing thru the venturi, the velocity of the air varies in accordance with its density, it will be apparent that in order to secure an accurate measure of the mass of the flowing air the pressure difference between the inlet 11 and the throat of venturi 12 must be compensated for variations in air density before transmission to the pressure meter 22. This compensation is accomplished by valve 26. The total pressure difference between inlet 11 and the throat of venturi 12 may be separated into two components, one being the pressure drop across restriction 23 and the other being the drop across valve 26. The drop across valve 26 is varied in accordance with the density of the flowing air in a manner so that the drop across restriction 23 is a true measure of the mass of the air, and is unaffected by its density.

Since the pressure in chamber 27 also varies in accordance with the velocity of the air flowing thru Venturi restriction 12, the bellows 30 also operates the valve 26 as a function of that velocity, and thereby compensates for errors inherent in the characteristics of the Venturi meter.

The fuel flowing thru the carburetor comes from a fuel pump or other source of fuel under pressure (not shown), and passes thru a conduit 31, a fuel regulator 32, a conduit 33, a mixture control generally indicated at 34, conduits 35 and 36, a jet system generally indicated at 37, a conduit 38, past an idle valve 88, and through a conduit 39, a pressure regulator 40 and a conduit 41 to discharge nozzle 15.

The fuel regulator 32 includes a casing 42 divided by a flexible diaphragm 43 into a pair of expansible chambers 44 and 45. The diaphragm 43 carries at its center a valve 46, which is balanced against inlet pressure and biased toward open position by a spring 47. A restricted passage 48 interconnects the chambers 44 and 45. A conduit 50 connects the chamber 44 with an expansible chamber 51 in the pressure meter 22.

The pressure meter 22 includes a housing 52 separated by three flexible diaphragms 53, 54 and 55 into four expansible chambers 51, 24, 21 and 56. The diaphragms 53, 54 and 55 are attached at their centers to a sleeve valve 57, which cooperates with a conical seat 58 on a cylindrical post 60 extending thru the sleeve valve 57. The right end of the post 60, as it appears in the drawing, carries a stop 61 to limit the movement of the valve 57 in that direction.

The mixture control 34 includes a disc valve 62 fixed on a rotatable shaft 63. The disc valve 62 may be operated by rotation of shaft 63 to selectively open and close ports connected to the conduits 33, 35 and 36. Rotation of shaft 63 is preferably accomplished by means of a manual lever or other manually operable control device.

Fuel entering the jet system 37 thru conduit 35 may flow to the conduit 38 either thru a fixed restriction 64 or thru one of a pair of variable restrictions 65 and 66. The variable restrictions 65 and 66 are controlled by poppet valves 67 and 68, respectively, which are biased to closed position by biasing spring 70 and 71, respectively.

The upper end of the stem of valve 68 abuts against a rod 72 which extends thru a sealing diaphragm 73 to the exterior of the jet system 37 and carries at its outer end a plate 74. A cam 75 is positioned adjacent the plate 74 and is operated by the shaft 63 of mixture control 34. The cam 75 is so contoured that upon rotation of shaft 63 in a clockwise direction from the position shown in the drawing, the valve 68 is positively moved to open position against the action of the biasing spring 71.

Another cam 76 is positioned adjacent the plate 74 and is arranged to be rotated concurrently with the operation of throttle 14. The cam 76 is so contoured that when the throttle is in a range of positions, commonly known as the idle range, extending from its fully closed position to a position approximately 20% open, the cam 76 engages plate 74 and operates valve 68 to open position against the action of biasing spring 71.

Fuel entering the jet system 37 thru conduit 36 passes thru a fixed restriction 77 and a fixed restriction 78 to the conduit 38. Fuel flowing thru the variable restrictions 65 and 66 also passes thru the fixed restriction 78.

The pressure regulator 40 includes a casing 80 divided by a flexible diaphragm 81 into a pair of expansible chambers 82 and 83. The diaphragm 81 carries at its center a valve 84, which is illustrated as being balanced against outlet pressure, and is biased toward closed position by a spring 85. The chamber 82 is vented thru a conduit 86 to the passage 18 and thence thru impact tubes 17 to the inlet 11. The chamber 83 of the pressure regulator 40 is connected thru a conduit 87 to the chamber 56 of pressure meter 22.

The idle valve 88, located in a casing 89, is arranged to reciprocate upon rotation of an arm 90 fixed on a shaft 91. Shaft 91 carries, outside casing 89, another arm 96 which is connected by a link 97 to an arm 98 fixed on the shaft 100 of throttle 14. The idle valve 88 operates to restrict the flow of fuel thru conduit 38 when the throttle 14 is in the idle range.

*Operation of Figure 1*

A portion of the fuel entering the fuel regulator 32 passes thru restricted passage 48, chamber 44, conduit 50, chamber 51, past valve 57 to chamber 56, and thru conduit 87 to chamber 83 in the pressure regulator 40. The quantity of fuel flowing in this manner is controlled by the position of valve 57 in the pressure meter 22. The pressure in chamber 56 of pressure meter 22 is the same as that in chamber 83 of pressure regulator 40, and hence is substantially the same as that existing on the downstream side of the jet system 37. The pressure in chamber 51 of the pressure meter 22 is the same as that in chamber 44 of fuel regulator 32, which differs from the pressure in chamber 45 by an amount depending upon the strength of spring 47. Since the pressure in the chamber 45 is substantially the same as that on the upstream side of the jet system 37, it may be seen that the pressure differential between chambers 51 and 56 of the pressure meter 22 is a measure of the pressure differential across the jet system 37, and hence is a measure of the quantity of fuel flowing to the engine, for any given position of the mixture control 34 and the valves 67 and 68.

This pressure differential between chambers 51 and 56 acts on the sleeve valve 57 in an opening direction, while the pressure differential between chambers 21 and 24, which, as previously described, is a measure of the mass of air entering the carburetor, acts on sleeve valve 57 in a closing direction. The movement of valve 57 in the closing direction causes an increase in the pressure in chamber 51, and is transmitted thru conduit 50 to chamber 44, where it causes an opening movement of valve 46 and a corresponding increase in pressure on the upstream side of the jet system 37. Likewise an opening movement of sleeve valve 57 reduces the pressure in the chamber 51, which reduction is transmitted to fuel regulator 32 where it causes a reduction in the pressure on the upstream side of the jet system 37 and hence a reduction in the quantity of fuel flowing to the engine.

Changes in pressure in the chamber 83, which might be occasioned by variations in the pressure acting on the discharge nozzle, or by variations in the pressure in chamber 82, act thru the pressure meter 22 to produce corresponding changes in the pressure on the upstream side of the jet system 37, and hence have no effect on the quantity of fuel entering the engine. For example, an increase in pressure in chamber 83 is transmitted thru conduit 87 to chamber 56 of pressure meter 22, where it operates to move sleeve valve 57 toward closed position thereby increasing the pressure in chamber 51, which increase is transmitted thru conduit 50 to chamber 44, where it operates to open valve 46 and provide a parallel increase in pressure on the upstream side of jet system 37. The pressure differential across the jet system 37 therefore remains unchanged by the variation in pressure in chamber 83, and the quantity of fuel flowing thru the jet system 37 likewise remains unchanged.

When the throttle is in the idle range, the pressure differential produced by the low air flow is so small that its effect on the pressure meter 22 is erratic and unpredictable. Therefore, provision is made at such times to transfer the control of the fuel flow from the pressure meter 22 to the idle valve 88. This is done by the spring 47 which tends to move the valve 46 toward open position. When the air pressure differential acting on diaphragm 54 is small, the valve 57 opens wide, reducing the pressure in chamber 51 of pressure meter 22 and in chamber 44 of fuel regulator 32. Spring 47 is then effective to open valve 46 so as to cause a flow of fuel substantially greater than that required to balance the pressure in chamber 44. This flow is reduced in proportion to the position of throttle 14 by the idle valve 88, which is connected to throttle 14, as previously described.

When the valve 62 of mixture control 34 is in the position shown in full lines in the drawing, and the valves 67 and 68 are closed, fuel flows to the engine only thru the fixed restriction 64. Under these conditions, a very lean mixture of fuel and air is supplied to the engine. As the load on the engine increases, the pressure differential across the jet system 37 is increased, and when it exceeds a value determined by the strength of spring 71, the valve 68 opens, thereby allowing additional fuel to flow thru restriction 66, and enriching the mixture of fuel and air. In a similar manner, the valve 67 is opened when the pressure differential across the jet system exceeds a value determined by the strength of spring 70. The springs 70 and 71 are preferably so chosen that the valve 68 opens at a lower value of differential pressure across the jet system than does the valve 67. The position of valve 62 shown in the drawing may be termed the "special lean" or "emergency lean" position of the mixture control 34.

When the disc valve 62 is rotated to the position indicated by the dotted line 49 in the drawing, the cam 75 is rotated so as to force the valve 68 open. The fuel and air mixture is thereby enriched by the same amount that would occur if the fuel differential pressure had increased above the value determined by the strength of spring 71. This position of valve 62 may be termed the "lean" or "normal lean" position of the mixture control 34.

When the disc valve 62 is in the position indicated by the dotted line 59 in the drawing, fuel flows thru both conduits 35 and 36 to the jet system 37, and the valve 68 is still held open by the cam 75. This position may be termed the "rich" position of the mixture control 34.

When the throttle 14 is in its idle range, the cam 76 operates valve 68 to open position, thereby increasing the fuel to air ratio and insuring the operation of the engine under idling conditions with at least a "normal lean" mixture.

The variation of the fuel to air ratio with varying air flow in the various positions of the mixture control 34 is graphically illustrated in Figure 3. When the mixture control is in the "special lean" position shown in full lines in the drawing, the relationship between the fuel and air ratio and the air flow is illustrated by the curve A in full lines in Figure 3. In the range from zero air flow to the point 92 in Figure 3, the valve 68 is held open by the cam 76 so that the fuel to air ratio varies thru an intermediate range of values. When the air flow increases above that indicated by the point 92 in Figure 3, the cam 76 allows valve 68 to be closed by spring 71, thereby decreasing the fuel to air ratio, which then varies in accordance with the full line between the points 92 and 93. When the air flow increases to the value indicated by the point 93, the fuel pressure differential increases sufficiently to open valve 68 against the spring 71, so that the fuel to air ratio has an intermediate range of values. The spring 70 is arranged so that valve 67 opens at a value of air flow indicated by the point 94 in Figure 3, and the fuel to air ratio is thereby further increased when the air flow is above that value.

When the disc valve 62 is in the "normal lean" position illustrated by the dotted line 49 in Figure 1, the relationship between the fuel and air ratio and the air flow mostly follows the curve A in Figure 3, except that it follows the dotted line between the points 92 and 93, since under these conditions the valve 68 is open at all air flows.

When the disc valve 62 is in the "rich" position indicated by the dotted line 59, the relationship between fuel and air ratio and air flow is that illustrated by the curve B in Figure 3.

*Figure 2*

There is shown in Figure 2 an ignition timing control system which may be used with the mixture control system of Figure 1 in order to advance the ignition timing whenever a very lean fuel and air mixture is supplied to the engine.

Referring to Figure 2, there is shown an arm 101 attached to a shaft 102 which operates suitable ignition timing control mechanism, which may be of any desirable type. Bracket 103 is attached to the center of the arm 101. A rod 104 passes freely thru an aperture in the bracket 103. On the right hand side of bracket 103, the rod 104 carries a washer 105 which prevents the rod 104 from passing thru the aperture in the bracket 103 and permits the movement of arm 101 in a counter-clockwise direction by the rod 104.

The movements of arm 101 are limited by a pair of stops 106 and 107. A spring 108 biases the arm 101 for movement against the stop 107. The ignition timing control mechanism operated by shaft 102 is so arranged that the ignition timing is normal when the arm 101 is against stop 106, and is advanced when arm 101 is against stop 107.

The movements of rod 104 are controlled by a differential pressure responsive operating mechanism generally indicated at 110. This mechanism includes a housing 111 separated by flexible diaphragm 112 into a pair of expansible chambers 113 and 114. The chamber 113 is connected to the conduit 25 of Figure 1 and the chamber 114 is connected to the conduit 20 of Figure 1, so that the diaphragm 112 is operated by a pressure differential which is a measure of the quantity of air entering the engine. The diaphragm 112 is biased for movement toward the right by a spring 115. A sealing diaphragm 116 closes the opening in the casing 111 thru which the rod 104 passes.

From the foregoing, it may be seen that when the pressure differential acting on the diaphragm 112 is sufficiently high to overcome the springs 108 and 115, the arm 101 is operated to the full line position, in which position the ignition timing is normal. When the pressure differential acting on diaphragm 112 is less than this value, the springs 108 and 115 cooperate to move the arm 101 in a direction to advance the ignition timing. The springs 108 and 115 are preferably chosen so that the ignition timing is advanced whenever the air flow is less than that corresponding to the point 93 in Figure 3.

An elongated link 120 is pivotally attached to the upper end of arm 101. The opposite end of the link 120 passes freely thru an aperture in a pin 121, which is rotatably and slidably mounted in a slot 122 in an arm 123 attached to the throttle shaft 100. When the arm 123 is in the position shown in full lines in Figure 2, the throttle is in its closed position. As the throttle is moved toward open position, the arm 123 is moved to the right. The link 120 has a plate 124 fixed on it, so as to limit its sliding movement thru the pin 121. The pin 121 and slot 122, cooperating with the plate 124 on link 120, provide a lost motion connection by which the throttle shaft may be operated toward open position without changing the position of link 120. When the throttle is moved toward closed position, however, the pin 121 engages plate 124 and positively moves link 120 to the left, thereby moving arm 101 against the stop 106 to establish normal ignition timing. The arrangement is preferably such that the arm 101 is operated to its normal timing position at the same throttle position that cam 76 operates valve 68 to open position.

Near its center, the link 120 passes thru a pin 125 rotatably mounted in the end of an arm 126 attached to the mixture control shaft 63. A spring retainer 127 is attached to the pin 125 and another spring retainer 128 is fixed on the link 120. The retainers 127 and 128 retain between them a compression spring 130, which is stronger than the spring 108 which urges the arm 101 to its advanced timing position.

When the disc valve 62 is in the "rich" position indicated by the dotted line 91 in Figure 1, the arm 126 is in the position shown in full lines in Figure 2. The spring 130 then overcomes the spring 108 and causes the arm 101 to be moved against stop 106.

When the mixture control 34 is moved so that the disc valve 62 assumes the position indicated by the dotted line 90 in Figure 1, the arm 126 is moved somewhat to the right from the position illustrated in full lines but not as far as the dotted line position in Figure 2. Under such conditions, the spring 130 is extended somewhat, but still overcomes the spring 108 and retains the link 120 and arm 101 in the normal ignition timing position.

When the mixture control 34 is operated so that the valve 62 moves to the position indicated by the full line in Figure 1, the arm 126 moves to the position shown in dotted lines in Figure 2. Under those conditions, the spring 130 is no longer effective to overcome the spring 108, and the latter moves arm 101 to the advanced ignition timing position.

From the foregoing, it may be seen that when the mixture control 34 is operated to select the rich fuel and air ratio illustrated by the curve B in Figure 3, the ignition timing control is operated to give normal timing. Likewise, when the mixture control is operated to produce the "normal lean" fuel and air ratio illustrated by the curve A of Figure 3 including the dotted line position between points 92 and 93, the ignition timing is still maintained normal. However, when the mixture control 34 is operated to select the "special lean" fuel and air ratio illustrated by the full line characteristic between points 92 and 93 of Figure 3, the ignition timing is placed under control of the throttle and the differential pressure responsive control mechanism 110. Under these conditions, the throttle connection operates to insure normal ignition timing at air flows less than that corresponding to point 92 of Figure 3, and the mechanism 110 operates to insure normal ignition timing at air flows higher than that corresponding to the point 93 of Figure 3. At air flows in the range between the points 92 and 93 of Figure 3, the ignition timing is advanced by the spring 108.

Figure 4

There is illustrated in Figure 4 a modified form of mixture control and jet system which may be used in place of the mixture control 34 and jet system 37 of Figure 1. In the mixture control of Figure 4, it is not necessary to use mechanical connections for positively opening a valve in the jet system in accordance with the positions of the mixture control and throttle, such as the cams 75 and 76 in Figure 1.

In Figure 4, the fuel flows from the conduit 33, which may be the same as the conduit 33 of Figure 1, thru a mixture control 140 and a jet system 141 to a conduit 38, which may be the same as the conduit 38 of Figure 1. The mixture control 140 includes a disc valve 142 fixed on a shaft 143, which is rotatable to open and close ports connected with the conduit 33 and with conduits 144 and 145 thru which fuel may flow from the mixture control 140 to the jet system 141. The jets or restrictions 64, 65, 77 and 78 and their related parts are the same as the corresponding elements of Figure 1. In the jet system of Figure 4, the restriction 66 and the valve 68 of Figure 1 have been replaced by a restriction 146 thru which the fuel flow is controlled by a valve 147 operated by a flexible diaphragm 148. The diaphragm 148 is enclosed in a housing 150, which it separates into a pair of expansible chambers 151 and 152. The chamber 151 is connected by a conduit 153 to the conduit 145, and the chamber 152 is connected by conduit 154 to the conduit 144.

The valve 147 is of the piston type and moves in a cylinder 155 provided with a port 156 opening near its center. The piston valve 147 is biased downwardly by a spring 157 and is provided with apertures 158 to permit fuel to flow readily to both ends of the piston, thereby preventing dashpot action. It will be seen that when the piston valve 147 is in the position illustrated in the drawing, the port 156 is closed, and no fuel can then pass thru the restriction 146. As the piston valve 147 moves in either direction from its central position, the port 156 is uncovered, thereby permitting the flow of fuel thru the restriction 146.

Operation of Figure 4

When the mixture control 140 is in the position shown in the drawing, which may be termed its "lean" position, fuel flows only thru the conduit 144, and the pressure in chamber 152 is the same as that on the upstream side of the jet system, while the pressure in chamber 151 is the same as that on the downstream side of the jet system. The latter pressure is conveyed to the chamber 151 thru the restrictions 78 and 77 and conduits 145 and 153. Since there is then no fuel flowing thru the jets 77 and 78, there is no pressure drop across them. Therefore, when the mixture control 140 is in the position shown in the drawing, the position of valve 147 is controlled by the pressure drop across the jet system, which is in turn controlled by the quantity of air flowing thru the carburetor. Since the valve 147 is biased downwardly by the spring 157, it may be seen that when the air flow is low, the valve 147 is moved downwardly so as to open the port and permit fuel to flow thru restriction 146. At such times, the relationship between the fuel and air ratio and the air flow is that illustrated by the curve A in full lines in Figure 3. As the air flow increases, a value is reached which is determined by the strength of spring 157 and which may preferably correspond to the point 92 of Figure 3. When this value is reached, the pressure differential across the jet system compresses the spring 157 sufficiently to move the valve 147 so as to close port 156, thereby decreaseing the fuel to air ratio. As the air flow continues to increase, the fuel and air ratio remains at a low value until the pressure differential across the jet has increased sufficiently to move the diaphragm 148 and valve 147 upwardly far enough to open the port 156 again. This may occur at an air flow corresponding to the point 93 of Figure 3.

When the mixture control 140 is moved to a position wherein fuel flows thru both the conduits 144 and 145, which may be termed its "rich" position, the pressures in the chambers 151 and 152 are equal, and the valve 147 is then moved downwardly by the spring 157 to open the port 156 and permit fuel to flow thru restriction 146.

It may therefore be seen that the mixture control system of Figure 4 is functionally the same as that of Figure 1, except that no intermediate position of the mixture control is provided where the pilot may select a relationship between the fuel to air ratio and the air flow corresponding to the dotted line in Figure 3.

Figure 5

There is shown in Figure 5 a modified form of mixture control and ignition control mechanism which may be used to replace the mixture control of Figure 1 and the ignition control of Figure 2. In the system shown in Figure 5, no mechanical connections between the mixture control, the throttle and a valve in the jet system are necessary, and furthermore the fuel pressure is utilized as a source of power to operate the ignition control device.

Referring now to Figure 5, there is shown a mixture control 160 which receives fuel from a conduit 33, which may be the same as conduit 33 of Figure 1, and discharges it thru one or more of the conduits 161, 162 and 163 to a jet system generally indicated at 164, whence the fuel flows to a conduit 38, which may be the same as the conduit 38 of Figure 1.

The mixture control 160 includes a disc valve 164 fixed on a shaft 165 rotatable by a suitable mixture control lever operated by the pilot. The valve 164 controls the flow of fuel thru ports connected to the conduits 33, 161, 162 and 163.

The jet system 164 includes jets 64, 65, 77 and 78 which are the same as corresponding jets in Figure 1. In the jet system 164 of Figure 5, there is also provided a valve 166 operated by a diaphragm 167 which separates two expansible chambers 168 and 170. A spring 171 biases the valve 166 to closed position. The chamber 170 receives fuel from the conduit 161, and is connected thru a conduit 172 and a conduit 169 including a restriction 173 to the chamber 168. Chamber 168 is connected thru a conduit 174 to the conduit 38 on the downstream side of the jet system. The valve 166 controls a port which leads thru a conduit 175 to the upstream side of jet 77.

In the system of Figure 5, the ignition control is operated by a fluid motor 176 including a diaphragm 177 separating a pair of expansible chambers 178 and 180. The chamber 178 is connected to conduit 172, and the chamber 180 is connected to conduit 175. The diaphragm 177 is biased upwardly by a spring 181 and is attached at its center to a rod 182 connected with suitable ignition control mechanism. The ignition control mechanism is such that when the rod 182 is in the position shown, the ignition timing is normal, but when the rod 182 is moved downwardly, compressing the spring 181, the ignition timing is advanced.

*Operation of Figure 5*

When the mixture control 160 is in the position illustrated in full lines, the pressures in chambers 168 and 170 are equal, since they are connected thru restriction 173, thru which no fuel is flowing at this time. The valve 166 is therefore moved to closed position by spring 171. The relationship between fuel to air ratio and air flow is then the relationship determined by the restrictions 64, 65, 77 and 78, and represented by the curve B of Figure 3. At this time, the pressure in chamber 180 is that existing on the upstream side of the jet system, while the pressure in the chamber 178 is that existing on the downstream side of the jet system. The pressure differential across the jet system therefore acts on the diaphragm 177 to aid the spring 181 in maintaining the ignition control in its normal position.

If the mixture control 160 is now operated to move the valve 164 from the full line position in the drawing to the dotted line position, the flow of fuel thru conduit 162 is cut off while fuel is admitted to conduit 161. The full line position of the valve 164 is its "rich" position and the dotted line position is its "lean" position.

When the mixture control is in its lean position, the pressure differential across the jet system is applied to the diaphragm 157, since the chamber 168 is connected to the downstream side of the jet system thru conduit 174 and the chamber 170 is connected to the upstream side of the jet system thru conduit 161. Under these conditions, the relationship between the fuel and air ratio and the air flow follows the curve C of Figure 3 until the value of air flow is reached where the fuel pressure differential becomes sufficient to overcome spring 171 and open valve 166. This fuel pressure differential may be obtained at an air flow corresponding to the point 95 of Figure 3. When the valve 166 is opened, an additional amount of fuel flows thru jet 77, and the fuel to air ratio then varies with the air flow according to a characteristic such as curve A of Figure 3.

When the valve 164 is in its dotted line or lean position, the pressure in chamber 178 is the same as that of the upstream side of the jet system, to which it is connected thru conduit 172, chamber 170 and conduit 161. The pressure in chamber 180 at this time is the same as that on the downstream side of the jet system, to which it is connected thru conduit 175 and restrictions 77 and 78. Since no fuel is flowing thru restrictions 77 and 78 as long as valve 166 is closed, there is no pressure drop across them. In the fluid motor 176, the pressure differential across the jet system is now acting in opposition to the spring 181. At low values of air flow, the ignition timing remains normal, but when a value of air flow is reached which is determined by the strength of spring 181, the ignition timing is advanced. The advanced ignition timing is then maintained as the air flow increases until an air flow is reached at which valve 166 is opened, whereupon the pressures in chambers 178 and 180 are equalized thru the valve 166 and the ignition control is operated to its normal position by the spring 181.

It will be readily recognized by those skilled in the art that mechanism may be readily provided for adjusting the tension of the springs 181 and 171 of Figure 5 and the spring 157 in Figure 4 so as to control the particular values of air flow at which the various ignition timing and mixture control operations take place.

While I have illustrated my invention as applied to a fuel supply system in which the fuel and air are mixed before entering the combustion chamber, it is equally applicable to a direct injection system wherein the fuel is supplied directly to the cylinder of the internal combustion engine.

Altho I have shown and described certain preferred embodiments of my invention, other modifications thereof will readily occur to those skilled in the art, and I therefore intend my invention to be limited only by the appended claims.

I claim as my invention:

1. Control apparatus for an internal combustion engine, comprising movable means for controlling the ignition timing of said engine, a conduit for supplying air to said engine for combustion purposes, means associated with said conduit for producing two unequal pressures whose difference is indicative of the quantity of air flowing therethru, means for varying the ratio of fuel to air supplied to said engine including a manually operable member movable between a first position corresponding to a lean fuel to air ratio and a second position corresponding to a rich fuel to air ratio, means operated by the difference of said pressures for moving said ignition timing control means, and means effective upon movement of said member to said second position to cause operation of said ignition timing control means to establish normal ignition timing, regardless of the difference of said pressures.

2. Control apparatus for an internal combustion engine, comprising means for controlling the ignition timing of said engine, a conduit for supplying air to said engine for combustion purposes, means associated with said conduit for producing two unequal pressures whose difference is indicative of the quantity of air flowing therethru, means for varying the ratio of fuel to air supplied to said engine including a manually operable member movable between a first position corresponding to a lean fuel to air ratio and a second position corresponding to a rich fuel to air ratio, means responsive to the difference of said pressures for operating said ignition timing control means and a control element associated with said ignition timing control means, said control element being biased to a first position wherein said ignition timing control means is operated in accordance with said difference of pressures and movable to a second position wherein said ignition timing control means is operated to establish normal ignition timing, said member being effective upon movement to its second position to operatively engage said control element and positively move it to its second position.

3. Control apparatus for an internal combustion engine, comprising a first conduit for air flowing to said engine for combustion purposes, throttle means for controlling the flow of air thru said conduit, means for producing two unequal pressures whose difference is indicative of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, first means for controlling the cross-sectional area of said restriction means to control the ratio of fuel to air supplied to said engine including a member movable between a first position corresponding to a lean fuel to air ratio and a second position corresponding to a rich fuel to air ratio, ignition timing control means, second means for additionally controlling the cross-sectional area of said restriction means, means responsive to said difference of pressures for operating said second means and said ignition timing control means, mechanical means operative as an incident to movement of said member to said second position to override said operating means and to move said second means to an area increasing position and said ignition timing control means to establish normal ignition timing, and mechanical means operative as an incident to movement of said throttle means into a range of positions near its closed position to override said operating means and to move said second means to an area increasing position and said ignition timing control means to establish normal ignition timing.

4. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel to air supplied to said engine including a member movable between a first position corresponding to a lean fuel to air ratio and a second position corresponding to a rich fuel to air ratio, ignition timing control means, means responsive to said difference of pressures for operating said ignition timing control means, and mechanical means operative as an incident to movement of said member to said second position to override said operating means and to move said ignition timing control means to establish normal ignition timing.

5. Control apparatus for an internal combustion engine, comprising a first conduit for air flowing to said engine for combustion purposes, throttle means for controlling the flow of air thru said conduit, means for producing two unequal pressures whose difference is a measure of the quantity of air flowing thru said first conduit, a second conduit for fuel flowing to said engine, means responsive to said difference of pressures for controlling the quantity of fuel flowing thru said second conduit, ignition timing control means, means responsive to said difference of pressures for operating said ignition timing control means, and mechanical means operative as an incident to movement of said throttle means into a range of positions near its closed position to override said operating means and to move said ignition timing control means to establish normal ignition timing.

6. In a carburetor for an internal combustion engine, in combination, a main conduit for the fuel flowing thru said carburetor and a pair of parallel branch conduits, each said branch conduit having a restriction therein, mixture control valve means for selectively permitting the flow of fuel thru one or both of said branch conduits, fuel flow controlling means for varying the fuel flow thru said main conduit and hence the pressure differential across said restrictions, a third branch conduit including a restriction and connected in parallel with the restriction in said one branch conduit, a single valve for controlling the flow thru said third branch conduit, a valve port closed by said valve in an intermediate range of positions thereof and opened when said valve is outside said range in either direction, and means for operating said valve in response to the difference between the pressure differentials across the restrictions in said pair of conduits.

7. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, metering restriction means in said second conduit, means responsive to said difference of pressures for controlling the pressure differential across said restriction means and hence the quantity of fuel flowing therethru, means including a valve for controlling the effective cross-sectional area of said restriction means to control the ratio of fuel to air supplied to said engine, a pair of expansible chambers separated by a movable wall, a first passage connecting one of said chambers to said second conduit at a point upstream from said restriction means, a second passage connecting the other of said chambers to said second conduit at a point downstream from said restriction means, means including said wall for operating said valve, ignition timing control means including a movable member, means biasing said member to a position in which said control means establishes normal ignition timing, and means subject to the pressure differential across said valve to operate said ignition timing means against said biasing means, said biasing means being effective whenever said valve is open to cause establishment of normal ignition timing.

8. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine including at least two branch conduits, metering restriction means in said branch conduits, means responsive to said difference of pressures for controlling the pressure differential across said restriction means and hence the quantity of fuel flowing therethru, mixture control means for selectively controlling the number of said branch conduits open to the flow of fuel to control the ratio of fuel to air supplied to said engine, said mixture control means including a member movable between a first position corresponding to a lean fuel to air ratio and a second position corresponding to a rich fuel to air ratio, means including a valve in one of said branch conduits for additionally controlling the fuel to air ratio, a pair of expansible chambers separated by a movable wall, means including said wall for operating said valve, means biasing said valve to closed position, means including certain of said branch conduits for connecting said chambers to the opposite sides of said restriction means so that the pressure differential thereacross acts in opposition to said biasing means, ignition timing control means including a movable element, means biasing said element to a position in which said control means establishes normal ignition timing, means responsive to the pressure differential across said valve to operate said ignition timing means against its biasing means, said last-named biasing means being effective whenever said valve is open to cause establishment of normal ignition timing, and means operative as an incident to movement of said member to said second position to selectively close and open said branch conduits so as to apply the pressure differential across said restriction means to said ignition timing operating means in a direction to aid its associated biasing means.

9. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel to air supplied to said engine including a member movable between a first position corresponding to a lean fuel to air ratio and a second position corresponding to a rich fuel to air ratio, ignition timing control means, a pair of expansible chambers separated by a movable wall, means including said wall for operating said ignition timing control means, fluid connections for supplying said pressure differential to said chambers for operating said ignition timing control means, and means operative as an incident to movement of said member from said first to second positions to reverse said connections, said connections and said connection reversing means cooperating so that said pressure differential acts on said wall in a direction to advance said ignition timing when said member is in said first position and in a direction to retard said ignition timing when said member is in said second position.

10. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel to air supplied to said engine including a member movable between a first position corresponding to a lean fuel to air ratio and a second position corresponding to a rich fuel to air ratio, ignition timing control means, a pair of expansible chambers separated by a movable wall, means including said wall for operating said ignition timing control means, restricted fluid passages connecting each of said chambers with said fuel conduit downstream from said restriction means and means operative as an incident to movement of said member to selectively apply the pressure on the upstream side of said restriction means to one or the other of said chambers, said passages and said last-named means cooperating so that said pressure differential acts on said wall in a direction to advance said ignition timing when said member is in said first position and in a direction to retard said ignition timing when said member is in said second position.

11. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel to air supplied to said engine including a member movable between a first position corresponding to a lean fuel to air ratio and a second position corresponding to a rich fuel to air ratio, ignition timing control means, a pair of expansible chambers separated by a movable wall, means including said wall for operating said ignition timing control means, fluid connections for supplying said pressure differential to said chambers for operating said ignition timing control means, means operative as an incident to movement of said member from said first to second positions to reverse said connections, said connections and said connection reversing means cooperating so that said pressure differential acts on said wall in a direction to advance said ignition timing when said member is in said first position and in a direction to retard said ignition timing when said member is in said second position, means biasing said ignition timing control means to a normal position, and means effective when said member is in said first position and said pressure differential exceeds a predetermined value to establish a fluid connection between said chambers so that said ignition timing control means is operated to said normal position by said biasing means.

12. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, ignition timing control means including a movable element, means biasing said element to a position in which said ignition timing is advanced, means responsive to said difference of pressures for operating said ignition timing control means to retard said ignition timing when said difference exceeds a predetermined value, mixture control means including a member movable between a first position corresponding to a lean fuel to air ratio and a second position corresponding to a rich fuel to air ratio, and means operative as an incident to movement of said member to said second position to operate said ignition timing control means to retard said ignition timing.

13. Control apparatus for an internal combustion engine, comprising a first conduit for air flowing to said engine for combustion purposes, means for producing two unequal pressures whose difference is a measure of the mass of air flowing thru said first conduit per unit time, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel-to-air supplied to said engine including a member movable between the first position corresponding to a lean fuel-to-air ratio and a second position corresponding to a rich fuel-to-air ratio, ignition timing control means movable between a normal timing position and an advanced timing position, a first control element movable between a first position and a second position, means biasing said element to said first position, a diaphragm responsive to said difference of pressures for moving said element to said second position when said difference exceeds a predetermined value, a second control element movable between a first position and a second position, means biasing said second element to its first position, means associated with said member for moving said second element to its second position as said member moves from its first to its second positions, and means including said elements for controlling the movements of said ignition timing control means to move said ignition timing control means to its normal timing position when either of said elements is moved to its second position.

14. Control apparatus for an internal combustion engine, comprising a first conduit for air flowing to said engine for combustion purposes, throttle means for controlling the flow of air thru said conduit, means for producing two unequal pressures whose difference is a measure of the mass of air flowing thru said first conduit per unit time, a second conduit for fuel flowing to said engine, metering restriction means in said second conduit, means responsive to said difference of pressures for controlling the pressure differential across said metering restriction means and hence the quantity of fuel flowing therethru, ignition timing control means movable between a normal timing position and an advanced timing position, a first control element movable between a first position and a second position, means biasing said element to said first position, a diaphragm responsive to said difference of pressures for moving said element to said second position when said difference exceeds a predetermined value, a second control element movable between a first position and a second position, means biasing said second element to its first position, means associated with said throttle means for moving said second element to its second position as said throttle means moves into a range of positions adjacent its closed position, and means including said elements for controlling the movements of said ignition timing control means to move said ignition timing control means to its normal timing position when either of said elements is moved to its second position.

15. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel-to-air supplied to said engine, including a member movable between the first position corresponding to a lean fuel-to-air ratio and a second position corresponding to a rich fuel-to-air ratio, ignition timing control means movable between a normal timing position and an advanced timing position, a control element movable between a first position and a second position, means biasing said element to its first position, means associated with said member for mechanically engaging said element to move it to its second position as said member moves from its first to its second positions, and means including said element for controlling the movements of said ignition timing control means to move said ignition timing control means to its normal timing position when said element is moved to its second position.

16. Control apparatus for an internal combustion engine, comprising a first conduit for air flowing to said engine for combustion purposes, means for producing two unequal pressures whose difference is a measure of the mass of air flowing thru said first conduit per unit time, a second conduit for fuel flowing to said engine, metering restriction means in said second conduit, means responsive to said difference of pressures for controlling the pressure differential across said metering restriction means and hence the quantity of fuel flowing therethru, ignition timing control means movable between a normal timing position and an advanced timing position, a first control element movable between a first position and a second position, means biasing said element to said first position, a diaphragm responsive to said difference of pressures for moving said element to said second position when said difference exceeds a predetermined value, a second control element movable between a first position and a second position, means biasing said second element to its first position, means responsive to a condition indicative of the need for establishment of normal ignition timing for moving said second element to its second position when said condition assumes a predetermined value, and means including said elements for controlling the movements of said ignition timing control means to move said ignition timing control means to its normal timing position when either of said elements is moved to its second position.

17. Control apparatus for an internal combustion engine, comprising a first conduit for air flowing to said engine for combustion purposes, throttle means for controlling the flow of air thru said conduit, means for producing two unequal pressures whose difference is indicative of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel-to-air supplied to said engine including a member movable between a first position corresponding to a lean fuel-to-air ratio and a second position corresponding to a rich fuel-to-air ratio, ignition timing control means, means responsive to said difference of pressures for operating said ignition timing control means, first mechanical means operative as an incident to movement of said member to said second position to override said operating means and to move said ignition timing control means to establish normal ignition timing, and second mechanical means operative as an incident to movement of said throttle means into a range of positions adjacent its closed position to override said operating means and to move said ignition timing control means to establish normal ignition timing.

18. Control apparatus for an internal combustion engine, comprising a first conduit for air flowing to said engine for combustion purposes, means for producing two unequal pressures whose difference is a measure of the mass of air flowing thru said first conduit per unit time, a second conduit for fuel flowing to said engine, at least three parallel metering restrictions in said second conduit, means responsive to said difference of pressures for controlling the pressure differential across said metering restrictions and hence the quantity of fuel flowing therethru, means for controlling the total cross-sectional area of said restrictions to control the ratio of fuel-to-air supplied to said engine including a selector valve movable between a first position wherein fuel may flow thru two of said three restrictions and a second position wherein fuel may flow thru all of said three restrictions, a single additional valve for controlling one of said two restrictions, operating means for said additional valve to open said additional valve whenever said selector valve is in its first position and said mass air flow is above or below a predetermined intermediate range of values or whenever said selector valve is in its second position, ignition timing control means movable between a normal timing position and an advanced timing position, a first control element movable between a first position and a second position, means biasing said element to said first position, a diaphragm responsive to said difference of pressures for moving said element to said second position when said difference exceeds a predetermined value, a second control element movable between a first position and a second position, means biasing said second element to its first position, means associated with said selector valve for moving said second element to its second position as said selector valve moves from its first to its second positions, and means including said elements for controlling the movements of said ignition timing control means to move said ignition timing control means to its normal timing position when either of said elements is moved to its second position.

19. Control apparatus for an internal combustion engine, comprising a first conduit for air flowing to said engine for combustion purposes, throttle means for controlling the flow of air thru said conduit, means for producing two unequal pressures whose difference is a measure of the mass of air flowing thru said first conduit per unit time, a second conduit for fuel flowing to said engine, at least three parallel metering restrictions in said second conduit, means responsive to said difference of pressures for controlling the pressure differential across said metering restrictions and hence the quantity of fuel flowing therethru, means for controlling the total cross-sectional area of said restrictions to control the ratio of fuel-to-air supplied to said engine including a selector valve movable between a first position wherein fuel may flow thru two of said three restrictions and a second position wherein fuel may flow thru all of said three restrictions, a single additional valve for controlling one of said two restrictions, means biasing said additional valve toward closed position, said additional valve being constructed so as to open in the direction of fuel flow in response to an increase in said fuel pressure differential above a predetermined value, first cam means movable concurrently with said selector valve for opening said additional valve when said selector valve is moved to its second position, and second cam means movable concurrently with said throttle means for opening said additional valve when said throttle means moves into a range of positions adjacent its closed position.

20. Control apparatus for an internal combustion engine, comprising a first conduit for air flowing to said engine for combustion purposes, means for producing two unequal pressures whose difference is a measure of the mass of air flowing thru said first conduit per unit time, a second conduit for fuel flowing to said engine, at least three parallel branch conduits connected to said second conduit, each said branch conduit including a metering restriction, means responsive to said difference of pressures for controlling the pressure differential across said metering restrictions and hence the quantity of fuel flowing therethru, means for controlling the total cross-sectional area of said restrictions to control the ratio of fuel-to-air supplied to said engine including a selector valve movable between a first position wherein fuel may flow thru two of said three branch conduits and a second position wherein fuel may flow thru all of said three branch conduits, a single additional valve for controlling the flow thru one of said two branch conduits, a valve port closed by said valve in an intermediate range of positions thereof and opened when said valve is outside said range in either direction, a pair of expansible chambers separated by a diaphragm, an operating connection between said diaphragm and said valve, means biasing said valve for movement to one end of its range, and means connecting said chambers to one of said two branch conduits and the third of said branch conduits, respectively, at points between the selector valve and the restriction in said respective conduits, so that the pressures in said chambers are equal when said selector valve is in said second position and said biasing means is then effective to open said valve.

21. Control apparatus for an internal combustion engine, comprising a first conduit for air flowing to said engine for combustion purposes, means for producing two unequal pressures whose difference is indicative of the quantity of air flowing thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel-to-air supplied to said engine including a member movable between a first position corresponding to a lean fuel-to-air ratio and a second position corresponding to a rich fuel-to-air ratio, ignition timing control means, means responsive to said difference of pressures for operating said ignition timing control means, a control element movable between a first inactive position and a second position wherein it effectively interrupts control of said ignition timing control means by said pressure responsive means, means biasing said element to said first position, and means operative as an incident to movement of said member to its second position to engage said control element and move it to its second position.

22. Control apparatus for an internal combustion engine, comprising a first conduit for air flowing to said engine for combustion purposes, means for producing two unequal pressures whose difference is a measure of the mass of air flowing thru said first conduit per unit time, a second conduit for fuel flowing to said engine, at least three parallel metering restrictions in said second conduit, means responsive to said difference of pressures for controlling the pressure differential across said metering restrictions and hence the quantity of fuel flowing therethru, means for controlling the total cross-sectional area of said restrictions to control the ratio of fuel-to-air supplied to said engine including selector valve mechanism movable between a first position wherein only a first of said restrictions is opened to the flow of fuel, a second position wherein said first restriction and a second restriction are opened and a third position wherein all of said restrictions are opened, and additional means for opening said second restriction to the flow of fuel when said selector valve mechanism is in its first position and said mass air flow is above or below a predetermined intermediate range of values.

23. Control apparatus for an internal combustion engine, comprising a first conduit for air flowing to said engine for combustion purposes, means for producing two unequal pressures whose difference is a measure of the mass of air flowing thru said first conduit per unit time, a second conduit for fuel flowing to said engine, at least three parallel metering restrictions in said second conduit, means responsive to said difference of pressures for controlling the pressure differential across said metering restrictions and hence the quantity of fuel flowing therethru, means for controlling the total cross-sectional area of said restrictions to control the ratio of fuel-to-air supplied to said engine including selector valve mechanism movable between a first position wherein only a first of said restrictions is opened to the flow of fuel, a second position wherein said first restriction and a second restriction are opened and a third position wherein all of said restrictions are opened, additional means for opening said second restriction to the flow of fuel when said selector valve mechanism is in its first position and said mass air flow is above or below a predetermined intermediate range of values, ignition timing control means movable between a normal timing position and an advanced timing position, and means associated with said selector valve mechanism to cause operation of said ignition timing control means to its normal timing position when said selector valve mechanism is moved to its second or third positions, and to permit operation of said ignition timing control means to its advanced timing position when said selector valve mechanism is moved to its first position.

24. Control apparatus for an internal combustion engine, comprising a conduit for supplying air to said engine for combustion purposes, means associated with said conduit for producing two unequal pressures whose difference is indicative of the rate of air flow therethru, means for varying the ratio of fuel to air supplied to said engine including a manually operable member movable between a first position corresponding to a lean fuel-to-air ratio and a second position corresponding to a rich fuel-to-air ratio, a combustion control device associated with said engine and movable between a first position wherein it tends to oppose an excessive rise in the engine temperature and a second position wherein it increases the efficiency of the engine, means biasing said control device to said second position, means responsive to the difference of said pressures for operating said control device to said first position against said biasing means when said pressure difference exceeds a predetermined value, and a control element associated with said manually movable member for positively moving said device to said first position regardless of said pressure difference responsive means whenever said member is moved to its second position.

25. Control apparatus for an internal combustion engine, comprising a first conduit for air flowing to said engine for combustion purposes, means for producing two unequal pressures whose difference is indicative of the rate of air flow thru said first conduit, a second conduit for fuel flowing to said engine, metering restriction means in said second conduit, means responsive to said difference of pressures for controlling the pressure differential across said metering restriction means and hence the quantity of fuel flowing therethru, means for controlling the cross-sectional area of said restriction means to control the ratio of fuel-to-air supplied to said engine including a member movable between a first position corresponding to a lean fuel-to-air ratio and a second position corresponding to a rich fuel-to-air ratio, a combustion control device associated with said engine and movable between a first position wherein it tends to oppose an excessive rise in the engine temperature and a second position wherein it increases the efficiency of the engine, means biasing said control device to said second position, means responsive to the difference of said pressures for operating said control device to said first position against said biasing means when said pressure difference exceeds a predetermined value, a control element movable between a first inactive position and a second position wherein it effectively interrupts control of said device by said pressure difference responsive means and positively holds said device in said first position, and means operative as an incident to movement of said member to its second position to engage said control element and move it to its second position.

26. Fluid flow control apparatus, comprising a main fluid inlet conduit, a main fluid outlet conduit, a pair of parallel branch conduits each connected at one end to said inlet conduit and at the other end to said outlet conduit, a selector valve located at the junction of said branch conduits and one of said main conduits, said selector valve being movable between a first position wherein only one of said branch conduits is open and a second position wherein both said branch conduits are open, at least one restriction in each of said branch conduits, a third branch conduit having its inlet end opening into said one branch conduit at the upstream side of the restriction therein and having its outlet end opening into one of said conduits at a point where the pressure is substantially lower than that at the inlet end of said third branch conduit, a second valve in said third branch conduit, and operating means for said second valve, said operating means including means to open said second valve concurrently with movement of said selector valve to said second position and means to maintain said second valve open when said selector valve is in said first position and the pressure drop across said second valve is outside a predetermined range of values.

27. Fluid flow control apparatus, comprising a main fluid inlet conduit, a main fluid outlet conduit, a pair of parallel branch conduits each connected at one end to said inlet conduit and at the other end to said outlet conduit, a selector valve located at the junction of said branch conduits and one of said main conduits, said selector valve being movable between a first position wherein only one of said branch conduits is open and a second position wherein both said branch conduits are open, at least one restriction in each of said branch conduits, a third branch conduit having its inlet end opening into said one branch conduit at the upstream side of the restriction therein and having its outlet end opening into one of said conduits at a point where the pressure is substantially lower than that at the inlet end of said third branch conduit, a second valve in said third branch conduit, and operating means for said second valve, said operating means being effective to close said second valve when said selector valve is in its first position and the pressure drop across said second valve is within a predetermined range of values and to open said second valve at all other times.

28. Fluid flow control apparatus, comprising a main fluid inlet conduit, a main fluid outlet conduit, a pair of parallel branch conduits each connected at one end to said inlet conduit and at the other end to said outlet conduit, a selector valve located at the junction of said branch conduits and one of said main conduits, said selector valve being movable between a first position wherein only one of said branch conduits is open and a second position wherein both said branch conduits are open, at least one restriction in each of said branch conduits, a third branch conduit having its inlet end opening into said one branch conduit at the upstream side of the restriction therein and having its outlet end opening into one of said conduits at a point where the pressure is substantially lower than that at the inlet end of said third branch conduit, a second valve in said third branch conduit, and operating means for said second valve, said operating means including a spring biasing said second valve toward closed position, means responsive to the pressure drop across the second valve for opening it against the bias of said spring when said pressure drop exceeds a first predetermined value, first cam means movable concurrently with said selector valve for positively opening said second valve when said selector valve is moved to its second position, and second cam means operating under a condition generally indicative of the pressure drop across said second valve for opening said second valve when said condition indicates that said pressure drop has fallen below a second predetermined value lower than said first value.

29. Fluid flow control apparatus, comprising a main fluid inlet conduit, a main fluid outlet conduit, a pair of parallel branch conduits each connected at one end to said inlet conduit and at the other end to said outlet conduit, a selector valve located at the junction of said branch conduits and one of said main conduits, said selector valve being movable between a first position wherein only one of said branch conduits is open and a second position wherein both said branch conduits are open, at least one restriction in each of said branch conduits, a third branch conduit having its inlet end opening into said one branch conduit at the upstream side of the restriction therein and having its outlet end opening into one of said conduits at a point where the pressure is substantially lower than that at the inlet end of said third branch conduit, a second valve and a seat cooperating therewith in said third branch conduit, said valve being effective when in an intermediate range of positions to shut off the flow thru said third branch conduit and effective upon movement in either direction from said intermediate range to permit a flow of fluid thru said third branch conduit, operating means for said second valve including a pair of expansible chambers separated by a movable wall and a connection between said wall and said second valve, means connecting said chambers to said branch conduits at the upstream sides of the restrictions therein, a spring biasing said wall in opposition to the pressure in the chamber connected to said one branch conduit, said spring being effective to cause opening of said valve by movement thereof beyond said intermediate range in one direction whenever said selector valve is in its second position and when said selector valve is in its first position and the pressure difference between said inlet and outlet conduits is below a first predetermined value, said movable wall being effective to cause opening of said second valve by movement thereof beyond said intermediate range in the opposite direction when said selector valve is in its first position and the pressure difference between said inlet and outlet conduits exceeds a second predetermined value higher than said first value.

30. Fluid flow control apparatus, comprising a main fluid inlet conduit, a main fluid outlet conduit, a pair of parallel branch conduits each connected at one end to said inlet conduit and at the other end to said outlet conduit, a selector valve located at the junction of said branch conduits and one of said main conduits, said selector valve being movable between a first position wherein only one of said branch conduits is open and a second position wherein both said branch conduits are open, at least one restriction in each of said branch conduits, a third branch conduit having its inlet end opening into said one branch conduit at the upstream side of the restriction therein and having its outlet end opening into one of said conduits at a point where the pressure is substantially lower than that at the inlet end of said third branch conduit, a second valve in said third branch conduit, and means for operating said second valve, said operating means being effective when said selector valve is in said first position to open said second valve when the pressure drop across said second valve is above a first predetermined value or below a second lower value and to close said second valve when said pressure drop is between said first and second values.

SCOTT F. HUNT.

(References on following page)

REFERENCES CITED

The following references are of record in the file of this patent:

UNITED STATES PATENTS

| Number | Name | Date |
|---|---|---|
| 1,467,333 | Riege | Sept. 11, 1923 |
| 1,845,818 | Spiller | Feb. 16, 1932 |
| 2,091,924 | Harmon | Aug. 31, 1937 |
| 2,102,846 | Hunt | Dec. 21, 1937 |
| 2,198,100 | Worden | Apr. 23, 1940 |
| 2,232,351 | Udale | Feb. 18, 1941 |
| 2,330,650 | Weiche | Sept. 28, 1943 |
| 2,361,227 | Mock | Oct. 24, 1944 |
| 2,378,037 | Reggio | June 12, 1945 |

FOREIGN PATENTS

| Number | Country | Date |
|---|---|---|
| 853,146 | France | Mar. 11, 1940 |
| 523,895 | Great Britain | July 25, 1940 |

OTHER REFERENCES

Publication: Automotive Industries, June 15, 1941, pp. 620–624; vol. 84, No. 12. Copy in Patent Office Library.